United States Patent
Wu

(10) Patent No.: US 12,124,138 B2
(45) Date of Patent: Oct. 22, 2024

(54) LIQUID CRYSTAL DISPLAY PANEL AND DISPLAY DEVICE

(71) Applicants: HUIZHOU CHINA STAR OPTOELECTRONICS DISPLAY CO., LTD., Huizhou (CN); TCL CHINA STAR OPTOELECTRONICS TECHNOLOGY CO., LTD., Shenzhen (CN)

(72) Inventor: Wanchun Wu, Huizhou (CN)

( * ) Notice: Subject to any disclaimer, the term of this patent is extended or adjusted under 35 U.S.C. 154(b) by 0 days.

(21) Appl. No.: 17/600,125

(22) PCT Filed: Jul. 9, 2021

(86) PCT No.: PCT/CN2021/105493
§ 371 (c)(1),
(2) Date: Sep. 30, 2021

(87) PCT Pub. No.: WO2022/262027
PCT Pub. Date: Dec. 22, 2022

(65) Prior Publication Data
US 2024/0027853 A1     Jan. 25, 2024

(30) Foreign Application Priority Data
Jun. 16, 2021 (CN) .......................... 202110664565.X

(51) Int. Cl.
*G02F 1/1362*     (2006.01)
*G02F 1/1343*     (2006.01)

(52) U.S. Cl.
CPC .... *G02F 1/13624* (2013.01); *G02F 1/134336* (2013.01); *G02F 1/136213* (2013.01); *G02F 1/136286* (2013.01); *G02F 2201/40* (2013.01)

(58) Field of Classification Search
None
See application file for complete search history.

(56) References Cited

U.S. PATENT DOCUMENTS

| | | | |
|---|---|---|---|
| 2008/0018573 A1 | 1/2008 | Hsieh et al. | |
| 2009/0128724 A1 | 5/2009 | Chen et al. | |
| 2021/0118385 A1* | 4/2021 | Wang | .................. G09G 3/3607 |

FOREIGN PATENT DOCUMENTS

| | | |
|---|---|---|
| CN | 101364017 A | 2/2009 |
| CN | 101852955 A | 10/2010 |
| CN | 102375276 A | 3/2012 |
| CN | 102508386 A | 6/2012 |
| CN | 203337970 U | 12/2013 |
| CN | 107065352 A | 8/2017 |
| CN | 108983517 A | 12/2018 |
| CN | 110570825 A | 12/2019 |
| CN | 112068371 A | 12/2020 |

* cited by examiner

*Primary Examiner* — Nicholas J Lee

(57) ABSTRACT

The present disclosure discloses a liquid crystal display (LCD) panel and a display device. Two thin film transistors (TFT) are disposed in a sub-pixel of the LCD panel. A quantity of the TFTs is reduced, and an aperture ratio of the pixel is increased. A third capacitor is connected in series between a TFT in a sub-area and a liquid crystal capacitor in the sub-area. A voltage of the sub-area declines with an increase in capacitors. Therefore, a deflection angle of liquid crystal molecules in a main area is greater than a deflection angle of liquid crystal molecules in the sub-area, forming different viewing angles. In this way, a color shift is resolved.

16 Claims, 6 Drawing Sheets

LIQUID CRYSTAL DISPLAY PANEL AND DISPLAY DEVICE

FIELD OF INVENTION

The present disclosure relates to the field of display technologies, and in particular, to a liquid crystal display panel and a display device having the liquid crystal display panel.

BACKGROUND OF INVENTION

A thin film transistor-liquid crystal display (TFT-LCD) is one of main current flat-panel displays, and has become a mainstream technology for large-size TVs. With the enhancement of information technologies and living standards of people, people have increasingly high requirements for panel sizes, resolution, and image quality of displays.

An LCD screen has a color shift when being watched at a different angle. In order to alleviate the color shift, the prior art uses a 3T8-domain pixel structure, in which a pixel electrode of one sub-pixel is divided into a main area and a sub-area, the main area and the sub-area each have 4 domains, and 3 thin film transistors (TFT) are disposed between a bright area (or referred to as the main area) and a dark area (or referred to as the sub-area). FIG. 1 shows an equivalent circuit diagram of a conventional 3T8-domain pixel structure. In FIG. 1, a gate of the TFT $T_{main}$ in the main area is connected to a scan line, a source is connected to a data curve, and a drain is connected to one end of a storage capacitor $C_{st\_main}$ in the main area and one end of a liquid crystal capacitor $C_{lc\_main}$ in the main area. The other end of the storage capacitor $C_{st\_main}$ in the main area is connected to an array electrode Acom. The other end of the liquid crystal capacitor $C_{lc\_main}$ in the main area is connected to a CF electrode CFcom. A gate of the TFT $T_{sub}$ in the sub-area is connected to the scan line, a source is connected to the data line, and a drain is connected to one end of a storage capacitor $C_{st\_sub}$ in the sub-area and one end of a liquid crystal capacitor $C_{lc\_sub}$ in the sub-area. The other end of the storage capacitor $C_{st\_sub}$ in the sub-area is connected to the array electrode Acom. The other end of the liquid crystal capacitor $C_{lc\_sub}$ in the sub-area is connected to the CF electrode CFcom. A gate of the common TFT Tcs is connected to the data line, a source is connected to a drain of the TFT $T_{sub}$ in the sub-area, and a drain is connected to the array electrode Acom.

In addition, the priori art further uses a 3TPLUS8-domain pixel structure. Referring to FIG. 2, different from the 3T8-domain pixel structure, a second array electrode Acom2 is added between the bright (main) area and the dark (sub-) area, and the drain of the common TFT Tcs is connected to the second array electrode Acom2.

In both of the 3T8-domain pixel structure or the 3TPLUS8-domain pixel structure, different voltages are applied to the main area and the sub-area to incline liquid crystal molecules by different angles, thereby alleviating the color shift at a different viewing angle. However, the conventional 3T8-domain pixel structure and 3TPLUS8-domain pixel structure reduce an aperture ratio of a pixel, resulting in undesirable optical transmittance of the TFT-LCD.

SUMMARY OF INVENTION

Technical Problem

Embodiments of the present disclosure provide an LCD panel and a display device to resolve undesirable optical transmittance of a conventional LCD panel as a result of a low aperture ratio.

Technical Solution

The embodiments of the present disclosure provide an LCD panel. The LCD panel includes: a color film base plate and an array base plate disposed opposite to each other on a side of the array base plate that faces the color film base plate, wherein a liquid crystal layer is disposed between the color film base plate and the array base plate and includes a plurality of liquid crystal molecules, a first common electrode is disposed on a side of the color film base plate that faces the array base plate, and a second common electrode is disposed on a side of the array base plate that faces the color film base plate; and a plurality of sub-pixels in an array arrangement, each sub-pixel defines a main area and a sub-area spaced apart from each other, one scan line is disposed corresponding to each row of sub-pixels, the scan line is located between the main area and the sub-area, and one data line is disposed corresponding to each column of sub-pixels. The main area includes: a first TFT, a first storage capacitor, and a first liquid crystal capacitor. A gate of the first TFT is connected to the scan line. A source of the first TFT is connected to the data line. A drain of the first TFT is connected to one end of the first storage capacitor and one end of the first liquid crystal capacitor. The other end of the first storage capacitor is connected to the second common electrode. The other end of the first liquid crystal capacitor is connected to the first common electrode. The sub-area includes: a second TFT, a second storage capacitor, and a second liquid crystal capacitor. A gate of the second TFT is connected to the scan line. A source of the second TFT is connected to the data line. A drain of the second TFT is connected to one end of the second storage capacitor and one end of the second liquid crystal capacitor. The other end of the second storage capacitor is connected to the second common electrode. The other end of the second liquid crystal capacitor is connected to the first common electrode, The sub-area further includes a third capacitor connected in series between the drain of the second TFT and the second liquid crystal capacitor, so that a deflection angle of liquid crystal molecules corresponding to the sub-area is less than a deflection angle of liquid crystal molecules corresponding to the main area.

Further, a voltage of the sub-area is less than a voltage of the main area.

Further, a relationship between the voltage $V_{sub}$ of the sub-area and the voltage $V_{main}$ of the main area is expressed as $V_{sub}=V_{main}*C_x/(C_{lc\_sub}+C_x)$, wherein $V_{sub}$ is the voltage value of the sub-area, $V_{main}$ is the voltage value of the main area, $C_x$ is the third capacitor, and $C_{lc\_sub}$ is the second liquid crystal capacitor.

Further, a bottom electrode is disposed in the array base plate below a sub-pixel electrode in the sub-area, and the third capacitor is formed by the bottom electrode and the sub-pixel electrode.

Further, a gate insulating layer is disposed on a side of the bottom electrode that faces the sub-pixel electrode, and a protective layer is disposed between the gate insulating layer and the sub-pixel electrode.

Further, a first metal layer is disposed on a side of the gate insulating layer that faces away from the bottom electrode. At least one through hole extending through the gate insulating layer is provided on a surface of the gate insulating layer. A side of the bottom electrode that faces the gate insulating layer is exposed from the through hole. The first metal layer is deposited in the through hole and electrically connected to the bottom electrode.

Further, the bottom electrodes are in a one-to-one correspondence with main pixel electrodes of the sub-pixels, and one bottom electrode corresponds to the main pixel electrode of one sub-pixel.

Further, one bottom electrode corresponds to the main pixel electrodes of more than two sub-pixels.

Further, a first storage electrode connected to the drain of the first TFT is disposed in the main area. The first storage capacitor is formed by the first storage electrode and the second common electrode. The first liquid crystal capacitor is formed by a main pixel electrode in the main area and the first common electrode. The first storage electrode is connected to the main pixel electrode through a via hole. A second storage electrode connected to the drain of the second TFT is disposed in the sub-area. The second storage capacitor is formed by the second storage electrode and the second common electrode. The second liquid crystal capacitor is formed by a sub-pixel electrode in the sub-area and the first common electrode. the second storage electrode is connected to the sub-pixel electrode through the via hole.

In order to realize the above purposes, the present invention further provides a display device. The display device includes the above LCD panel.

Beneficial Effects

The present disclosure has the following beneficial effects. In the LCD panel that is provided, one sub-pixel includes 2 TFTs, to form a normal 2T+8-domain sub-pixel structure. A quantity of the TFTs in the sub-pixel is reduced, and impact of discharging of a third TFT on the common electrode on the array base plate can be eliminated. In this way, horizontal crosstalk is reduced, and the aperture ratio of the pixel is further increased. In addition, a third capacitor is connected in series between the TFT in the sub-area and the liquid crystal capacitor in the sub-area. The voltage of the sub-area changes due to the capacitor, so that deflection angles of liquid crystal molecules in the main area and in the sub-area are different, thereby forming different viewing angles. In this way, the color shift is resolved.

BRIEF DESCRIPTION OF DRAWINGS

The following describes specific implementations of the present disclosure in detail with reference to the accompanying drawings, to make the technical solutions and other beneficial effects of the present disclosure obvious.

100. Liquid crystal panel; 110. Color film base plate; 111. First common electrode; 120. Array base plate; 121. Second common electrode; 130. Liquid crystal layer; 131. Liquid crystal molecule; 140. Sub-pixel; 141. Main area; 1411. First storage electrode; 1412. Main pixel electrode; 142. Sub-area; 1421. Second storage electrode; 1422. Sub-pixel electrode; 150. Scan line; 160. Data line; 170. Bottom electrode; 181. Gate insulating layer; 1811. Through hole; 182. Protective layer; 183. First metal layer; T1. First thin film transistor; T2. Second thin film transistor; $C_{s1}$. First storage capacitor; $C_{lc1}$. First liquid crystal capacitor; $C_{s2}$. Second storage capacitor; $C_{lc2}$. Second liquid crystal capacitor; $C_x$. Third capacitor.

DETAILED DESCRIPTION OF PREFERRED EMBODIMENTS

The technical solutions of the embodiments of the present invention are clearly and completely described in the following with reference to the accompanying drawings of the embodiments of the present invention. Apparently, the described embodiments are merely some but not all of the embodiments of the present invention. All other embodiments obtained by a person skilled in the art based on the embodiments of the present invention without creative efforts shall fall within the protection scope of the present invention.

Two TFTs are disposed in a sub-pixel of an LCD panel. Compared with a conventional 3T pixel structure, a quantity of the TFTs is reduced, and an aperture ratio of the pixel is increased. In addition, a third capacitor is connected in series between a TFT in a sub-area and a liquid crystal capacitor in the sub-area. A voltage of the sub-area declines with the increase of capacitors. Therefore, a deflection angle of liquid crystal molecules in a main area is greater than a deflection angle of liquid crystal molecules in the sub-area, forming different viewing angles. In this way, a color shift is resolved. As a typical application, the LCD panel is applicable to a display device, such as a thin film transistor-liquid crystal display (TFT-LCD).

Figure 1:
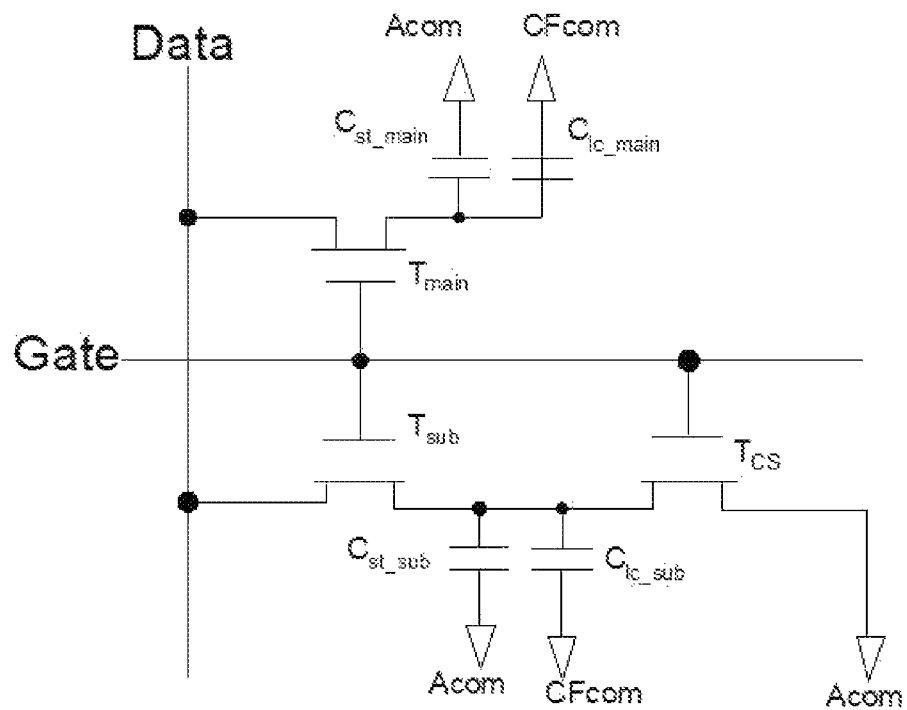
FIG. 1 is an equivalent circuit diagram of a conventional 3T8-domain pixel structure.
Figure 2:
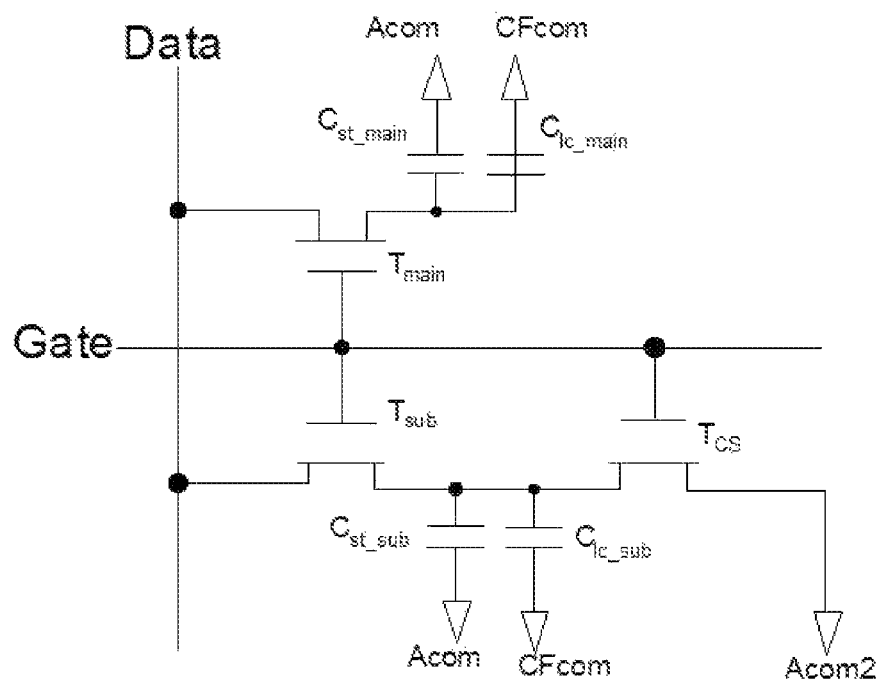
FIG. 2 is an equivalent circuit diagram of a conventional 3TPLUS8-domain pixel structure.
Figure 3:
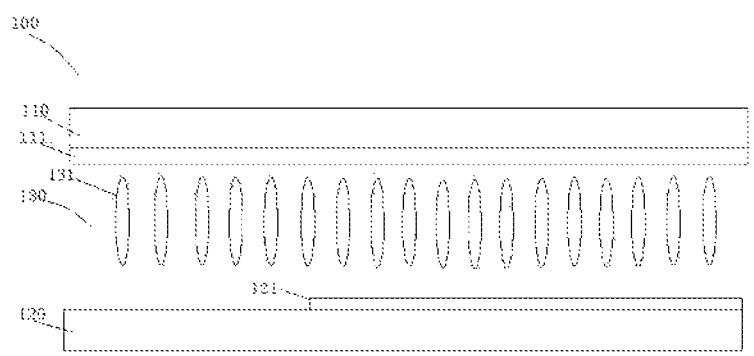
FIG. 3 is a schematic diagram of a structure of an LCD panel according to an exemplary embodiment of the present invention.
Figure 4:
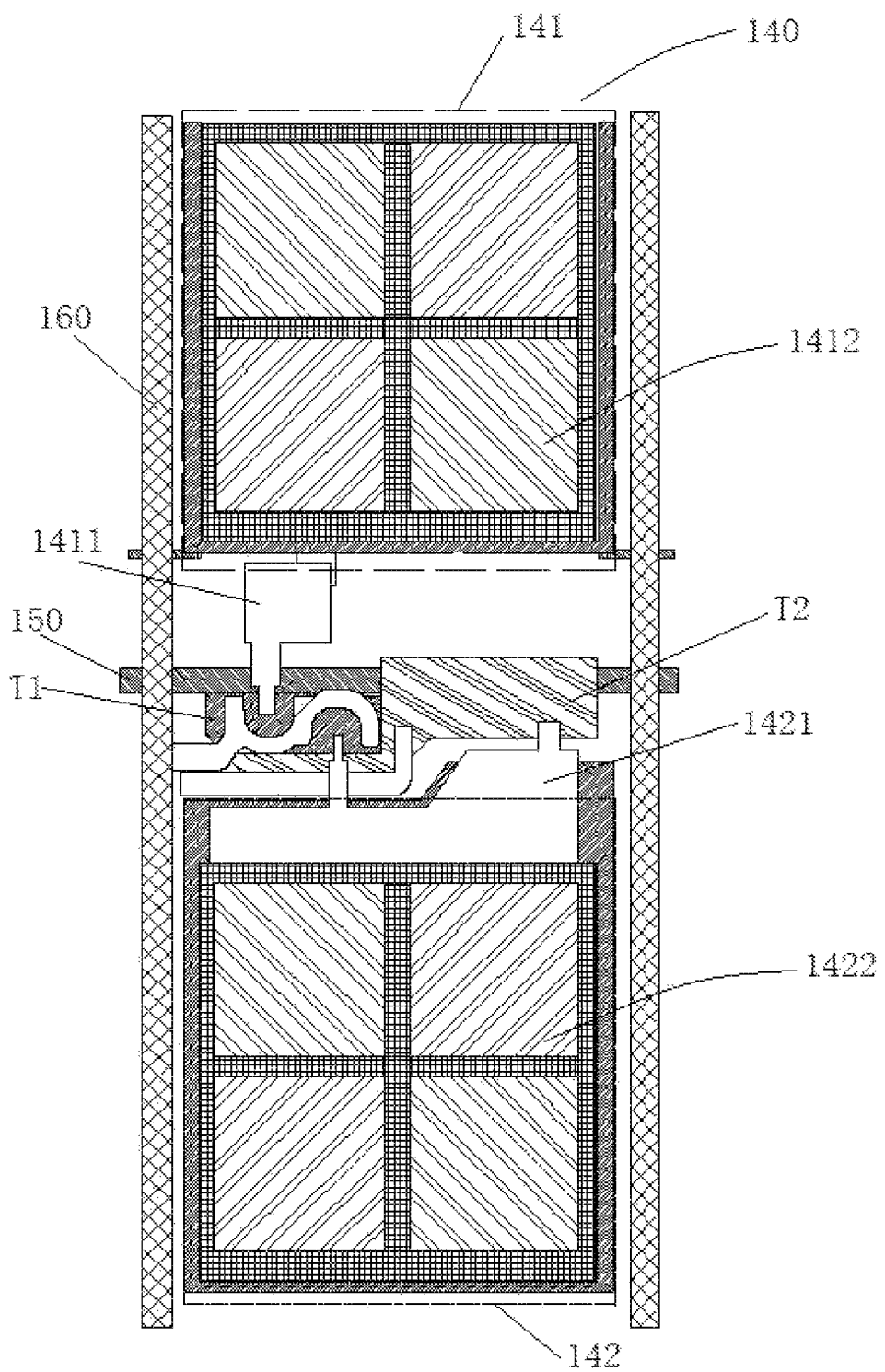
FIG. 4 is a schematic diagram of a structure of a sub-pixel in an LCD panel according to an exemplary embodiment of the present invention.

Referring to FIG. 3, in an embodiment of the present invention, the LCD panel 100 includes a color film base plate 110 and an array base plate 120 that are disposed opposite to each other. A liquid crystal layer 130 is disposed between the color film base plate 110 and the array base plate 120. The liquid crystal layer 130 includes a plurality of liquid crystal molecules 131. A first common electrode 111 is disposed on a side of the color film base plate 110 that faces the array base plate 120. A second common electrode 121 is disposed on a side of the array base plate 120 that faces the color film base plate 110. A plurality of sub-pixels 140 (not shown in the figure) in an array arrangement are further disposed on the side of the array base plate 120 that faces the color film base plate 110. Referring to FIG. 4, each sub-pixel 140 defines a main area 141 and a sub-area 142. In the array, one scan line 150 is disposed corresponding to each row of sub-pixels, and the scan line 150 is located between the main area 141 and the sub-area 142. One data line 160 is disposed corresponding to each column of sub-pixels.

Figure 5:
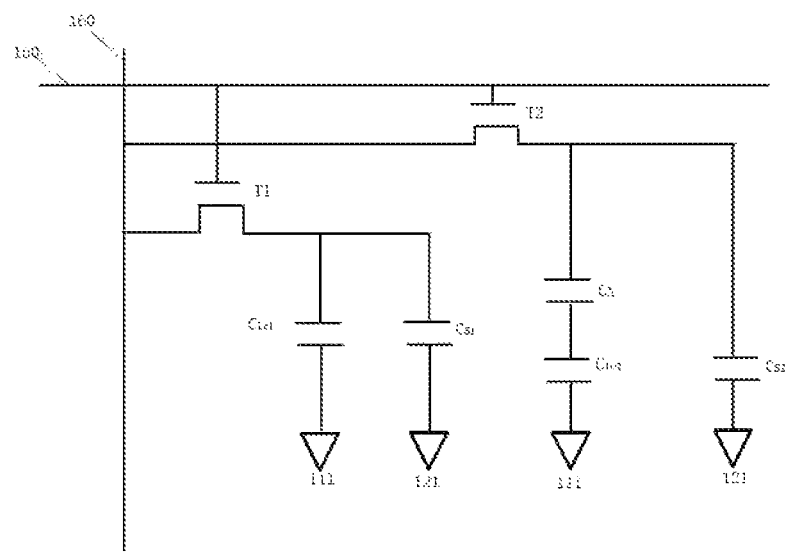
FIG. 5 is an equivalent circuit diagram of a sub-pixel in an LCD panel according to an exemplary embodiment of the present invention.
Figure 6:
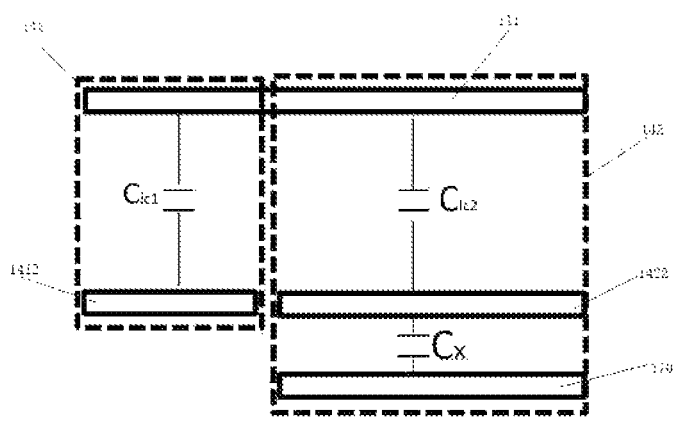
FIG. 6 is a schematic formation diagram of a first liquid crystal capacitor, a second liquid crystal capacitor, and a third capacitor in an LCD panel according to an exemplary embodiment of the present invention.

Referring to FIG. 5, the main area 141 includes a first TFT T1, a first storage capacitor $C_{s1}$, and a first liquid crystal capacitor Cu. A gate of the first TFT T1 is connected to the scan line 150. A source of the first TFT is connected to the data line 160. A drain of the first TFT is connected to one end of the first storage capacitor $C_{s1}$ and one end of the first liquid crystal capacitor $C_{lc1}$. The other end of the first storage capacitor $C_{s1}$ is connected to the second common electrode 121. The other end of the first liquid crystal capacitor $C_{lc1}$ is connected to the first common electrode 111. The sub-area 142 includes a second TFT T2, a second storage capacitor $C_{S2}$, and a second liquid crystal capacitor $C_{lc2}$. A gate of the second TFT T2 is connected to the scan line 150. A source of the second TFT is connected to the data line 160. A drain of the second TFT is connected to one end of the second storage capacitor $C_{S2}$ and one end of the second liquid crystal capacitor $C_{lc2}$. The other end of the second storage capacitor $C_{S2}$ is connected to the second common electrode 121. The other end of the second liquid crystal capacitor $C_{lc2}$ is connected to the first common electrode 111.

In the present embodiment, one sub-pixel 140 include 2 TFTs (that is, a first TFT T1 and a second TFT T2), to form a normal 2T+8-domain sub-pixel structure design. The main area 141 and the sub-area 142 respectively correspond to 4-domain liquid crystal molecules. A quantity of the TFTs in the sub-pixel 140 is reduced. Compared with a conventional 3T8-domain sub-pixel structure, impact of discharging of a third TFT on the second common electrode 121 on the array base plate 120 can be eliminated. In this way, horizontal crosstalk is reduced, and an aperture ratio of the pixel is increased.

Figure 11:
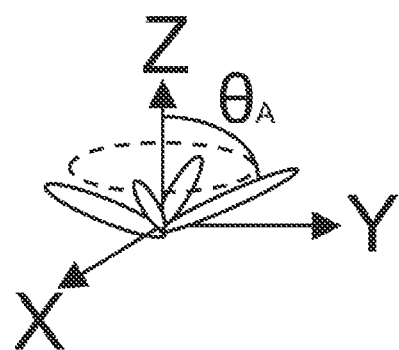
FIG. 11 is a schematic diagram of a deflection form of liquid crystal molecules corresponding to a main area in a sub-pixel of an LCD panel under driving of an electric field according to an exemplary embodiment of the present invention.
Figure 12:
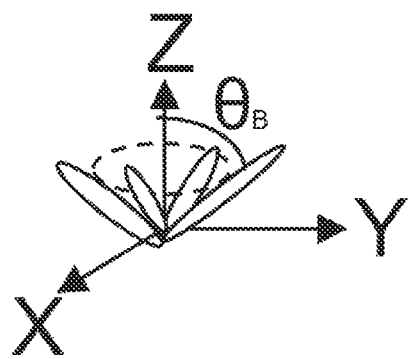
FIG. 12 is a schematic diagram of a deflection form of liquid crystal molecules corresponding to a sub-area in a sub-pixel of an LCD panel under driving of an electric field according to an exemplary embodiment of the present invention.

Referring to FIG. 5, in the present embodiment, a third capacitor $C_x$ is connected in series between the drain of the second TFT T2 and the second liquid crystal capacitor $C_{lc2}$. Connecting the third capacitor $C_x$ to the second liquid crystal capacitor $C_{lc2}$ in series increases a capacitance and reduces a voltage of the sub-area 142, so that a deflection angle $\theta_A$ (refer to FIG. 11) of the liquid crystal molecules 131 corresponding to the sub-area 142 is reduced, forming a difference with a deflection angle $\theta_B$ (refer to FIG. 12) of the liquid crystal molecules 131 corresponding to the main area 141, thereby forming different viewing angles. In this way, a color shift of the LCD panel 100 is resolved.

In the present embodiment, referring to FIGS. 3 to 6, a first storage electrode 1411 connected to the drain of the first TFT T1 is disposed in the main area 141. The first storage capacitor $C_{s1}$ is formed by the first storage electrode 1411 and the second common electrode 121. The first liquid crystal capacitor $C_{lc1}$ is formed by a main pixel electrode 1412 in the main area 141 and the first common electrode 111. The first storage electrode 1411 is connected to the main pixel electrode 1412 through a via hole (not shown in the figure). A second storage electrode 1421 connected to the drain of the second TFT T2 is disposed in the sub-area 142. The second storage capacitor $C_{lc2}$ is formed by the second storage electrode 1421 and the second common electrode 121. The second liquid crystal capacitor $C_{lc2}$ is formed by a sub-pixel electrode 1422 in the sub-area 142 and the first common electrode 111. The second storage electrode 1421 is connected to the sub-pixel electrode 1422 through the via hole.

In the present embodiment, the first common electrode 111 is an indium tin oxide electrode (ITO electrode), the second common electrode 121 is an array electrode (array COM), and the main pixel electrode 1412 and the sub-pixel electrode 1422 are indium tin oxide electrodes (ITO electrodes). Pixel patterns on the main pixel electrode 1412 and the sub-pixel electrode 1422 are made using yellow light.

In another embodiment of the present invention, the voltage of the sub-area 142 is less than a voltage of the main area 141. In the present embodiment, according to the principle of conservation of charge, a relationship between the voltage $V_{sub}$ of the sub-area 142 and the voltage $V_{main}$ of the main area 141 is expressed as $V_{sub}=V_{main}*C_x/(C_{lc\_sub}+C_x)$, wherein $V_{sub}$ is the voltage value of the sub-area, $V_{main}$ is the voltage value of the main area, $C_x$ is the third capacitor, and $C_{lc\_sub}$ is the second liquid crystal capacitor. It may be learned from the expression that, by virtue of the third capacitor $C_x$ a voltage difference is formed between the voltage Vail, of the sub-area 142 and the voltage $V_{main}$ of the main area 141. Therefore, an electric field intensity difference is formed, so that deflection angles of the liquid crystal molecules corresponding to the main area 141 and the sub-area 142 are different, thereby forming different viewing angles. In this way, the color shift of the LCD panel 100 is resolved.

Figure 7:
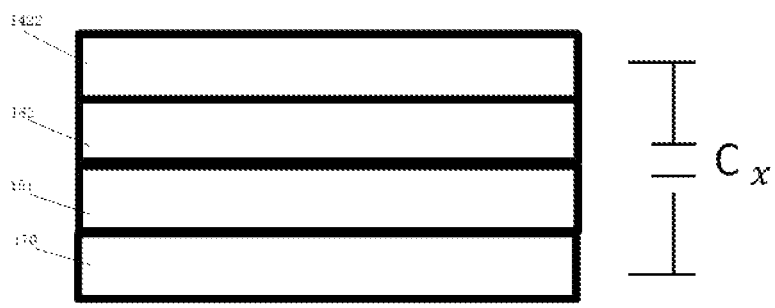
FIG. 7 is a schematic diagram of a structure of a sub-pixel electrode and a bottom electrode in an LCD panel according to an exemplary embodiment of the present invention.

In an embodiment of the present invention, referring to FIG. 7, the third capacitor $C_x$ is formed. A bottom electrode 170 is disposed in the array base plate 120 below the sub-pixel electrode 1422 in the sub-area 142. The third capacitor $C_x$ is formed by the bottom electrode 170 and the sub-pixel electrode 1422. The bottom electrode 170 receives a voltage signal to form the third capacitor $C_x$ with the sub-pixel electrode 1422.

In the present embodiment, a gate insulating layer 181 is disposed on a side of the bottom electrode 170 that faces the sub-pixel electrode 1422, and a protective layer 182 is disposed between the gate insulating layer 181 and the sub-pixel electrode 1422.

The bottom electrode 170 is an indium tin oxide electrode (ITO electrode).

Figure 8:
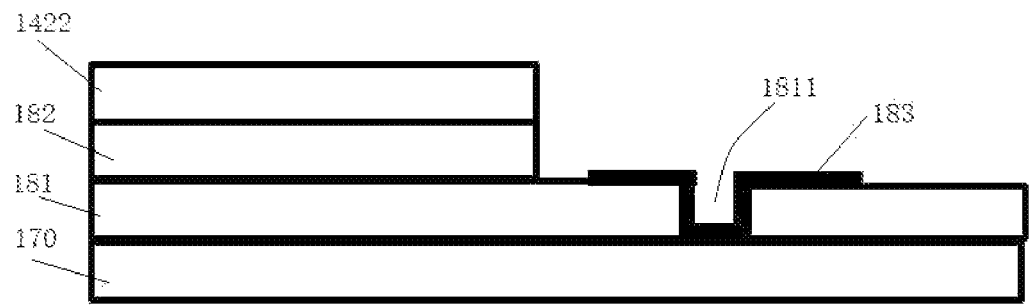
FIG. 8 is a schematic diagram of a structure of a sub-pixel electrode and a bottom electrode in an LCD panel according to an exemplary embodiment of the present invention.

In another embodiment of the present invention, referring to FIG. 8, a first metal layer 183 is disposed on a side of the gate insulating layer 181 that faces away from the bottom electrode 170. At least one through hole 1811 extending through the gate insulating layer 181 is provided on a surface of the gate insulating layer 181. A side of the bottom electrode 170 that faces the gate insulating layer 181 is exposed from the through hole 1811. The first metal layer 183 is deposited in the through hole 1811 and electrically connected to the bottom electrode 170. By means of the through hole 1811, the first metal layer 183 (M1) can be deposited on the bottom electrode 170 and electrically connected to the bottom electrode 170. Therefore, a voltage signal is introduced from the first metal layer 183 to the bottom electrode 170. In this way, the third capacitor $C_x$ is conveniently formed between the bottom electrode 170 and the sub-pixel electrode 1422, and the voltage signal of the bottom electrode 170 is conveniently adjusted.

Figure 9:
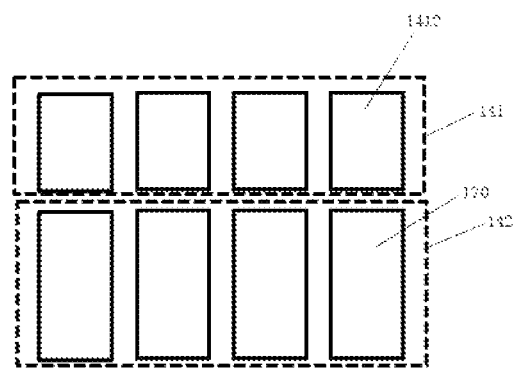
FIG. 9 is a schematic diagram of a corresponding structure of a bottom electrode and a main pixel electrode in an LCD panel according to an exemplary embodiment of the present invention.

In an embodiment of the present invention, referring to FIG. 9, the bottom electrodes 170 are in a one-to-one correspondence with the main pixel electrodes 1412 of the sub-pixels 140 one by one, and one bottom electrode 170 corresponds to the main pixel electrode 1412 of one sub-pixel 140. By means of the one-to-one correspondence between the bottom electrodes 170 and the main pixel electrodes 1412, which means that one bottom electrode 170 corresponds to one sub-pixel 140, the accuracy of controlling a capacitance of the third capacitor $C_x$ can be enhanced.

Figure 10:
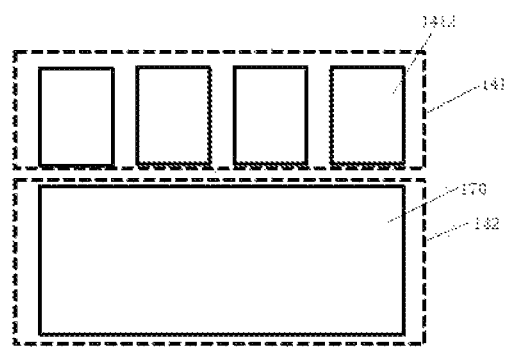
FIG. 10 is a schematic diagram of a corresponding structure of a bottom electrode and a main pixel electrode in an LCD panel according to an exemplary embodiment of the present invention.

In another embodiment of the present invention, referring to FIG. 10, one bottom electrode 170 corresponds to the main pixel electrodes 1412 of two or more sub-pixels 140. In the present embodiments, one bottom electrode 170 corresponds to 4 main pixel electrodes 1412. By means of the one-to-many correspondence between the bottom electrodes 170 and the main pixel electrodes 1412, which means that one bottom electrode 170 corresponds to a plurality of sub-pixels 140, costs of production and manufacturing can be reduced.

In conclusion, although exemplary embodiments of the present disclosure have been disclosed above, the exemplary embodiment are not intended to limit the present disclosure. A person of ordinary skill in the art can make various modifications and embellishments without departing from the spirit and scope of the present disclosure. Therefore, the protection scope of the present disclosure falls within the scope defined by the claims.

What is claimed is:

1. A liquid crystal display (LCD) panel comprising:
a color film base plate and an array base plate disposed opposite to each other, wherein a liquid crystal layer is disposed between the color film base plate and the array base plate and comprises a plurality of liquid crystal molecules, a first common electrode is disposed on a side of the color film base plate that faces the array base plate, and a second common electrode is disposed on a side of the array base plate that faces the color film base plate; and
a plurality of sub-pixels in an array arrangement, wherein the sub-pixels are disposed on the side of the array base plate that faces the color film base plate, each sub-pixel defines a main area and a sub-area spaced apart from each other, one scan line is disposed corresponding to each row of sub-pixels, the scan line is located between the main area and the sub-area, and one data line is disposed corresponding to each column of sub-pixels;
the main area comprises: a first thin film transistor (TFT), a first storage capacitor, and a first liquid crystal capacitor, a gate of the first TFT is connected to the scan line, a source of the first TFT is connected to the data line, a drain of the first TFT is connected to one end of the first storage capacitor and one end of the first liquid crystal capacitor, another end of the first storage capacitor is connected to the second common electrode, and another end of the first liquid crystal capacitor is connected to the first common electrode; and
the sub-area comprises: a second TFT, a second storage capacitor, and a second liquid crystal capacitor, a gate of the second TFT is connected to the scan line, a source of the second TFT is connected to the data line, a drain of the second TFT is connected to one end of the second storage capacitor and one end of the second liquid crystal capacitor, another end of the second storage capacitor is connected to the second common electrode, and another end of the second liquid crystal capacitor is connected to the first common electrode,
wherein the sub-area further comprises a third capacitor connected in series between the drain of the second TFT and the second liquid crystal capacitor, so that a deflection angle of liquid crystal molecules corresponding to the sub-area is less than a deflection angle of liquid crystal molecules corresponding to the main area; and wherein a bottom electrode is disposed in the array base plate below a sub-pixel electrode in the sub-area, and the third capacitor is formed by the bottom electrode and the sub-pixel electrode.

2. The LCD panel as claimed in claim 1, wherein a voltage of the sub-area is less than a voltage of the main area.

3. The LCD panel as claimed in claim 2, wherein a relationship between the voltage Vsub of the sub-area and the voltage Vmain of the main area is expressed as Vsub=Vmain*Cx/(Clc_sub+Cx), wherein Vsub is the voltage value of the sub-area, Vmain is the voltage value of the main area, Cx is the third capacitor, and Clc_sub is the second liquid crystal capacitor.

4. The LCD panel as claimed in claim 1, wherein a gate insulating layer is disposed on a side of the bottom electrode that faces the sub-pixel electrode, and a protective layer is disposed between the gate insulating layer and the sub-pixel electrode.

5. The LCD panel as claimed in claim 4, wherein a first metal layer is disposed on a side of the gate insulating layer that faces away from the bottom electrode, at least one through hole extending through the gate insulating layer is provided on a surface of the gate insulating layer, a side of the bottom electrode that faces the gate insulating layer is exposed from the through hole, and the first metal layer is deposited in the through hole and electrically connected to the bottom electrode.

6. The LCD panel as claimed in claim 4, wherein the bottom electrodes are in a one-to-one correspondence with main pixel electrodes of the sub-pixels, and one bottom electrode corresponds to the main pixel electrode of one sub-pixel.

7. The LCD panel as claimed in claim 4, wherein one bottom electrode corresponds to the main pixel electrodes of more than two sub-pixels.

8. The LCD panel as claimed in claim 1, wherein a first storage electrode connected to the drain of the first TFT is disposed in the main area; the first storage capacitor is formed by the first storage electrode and the second common electrode; the first liquid crystal capacitor is formed by a main pixel electrode in the main area and the first common electrode; the first storage electrode is connected to the main pixel electrode through a via hole;

a second storage electrode connected to the drain of the second TFT is disposed in the sub-area; the second storage capacitor is formed by the second storage electrode and the second common electrode; the second liquid crystal capacitor is formed by a sub-pixel electrode in the sub-area and the first common electrode;

and the second storage electrode is connected to the sub-pixel electrode through the via hole.

9. A display device comprising an LCD panel, wherein the LCD panel comprises:
  a color film base plate and an array base plate disposed opposite to each other, wherein a liquid crystal layer is disposed between the color film base plate and the array base plate and comprises a plurality of liquid crystal molecules, a first common electrode is disposed on a side of the color film base plate that faces the array base plate, and a second common electrode is disposed on a side of the array base plate that faces the color film base plate; and
  a plurality of sub-pixels in an array arrangement, wherein the sub-pixels are disposed on the side of the array base plate that faces the color film base plate, each sub-pixel defines a main area and a sub-area spaced apart from each other, one scan line is disposed corresponding to each row of sub-pixels, the scan line is located between the main area and the sub-area, and one data line is disposed corresponding to each column of sub-pixels;
  the main area comprises: a first TFT, a first storage capacitor, and a first liquid crystal capacitor, a gate of the first TFT is connected to the scan line, a source of the first TFT is connected to the data line, a drain of the first TFT is connected to one end of the first storage capacitor and one end of the first liquid crystal capacitor, another end of the first storage capacitor is connected to the second common electrode, and another end of the first liquid crystal capacitor is connected to the first common electrode; and
  the sub-area comprises: a second TFT, a second storage capacitor, and a second liquid crystal capacitor, a gate of the second TFT is connected to the scan line, a source of the second TFT is connected to the data line, a drain of the second TFT is connected to one end of the second storage capacitor and one end of the second liquid crystal capacitor, another end of the second storage capacitor is connected to the second common electrode, and another end of the second liquid crystal capacitor is connected to the first common electrode,
  wherein the sub-area further comprises a third capacitor connected in series between the drain of the second TFT and the second liquid crystal capacitor, so that a deflection angle of liquid crystal molecules corresponding to the sub-area is less than a deflection angle of liquid crystal molecules corresponding to the main area; and
  wherein a bottom electrode is disposed in the array base plate below a sub-pixel electrode in the sub-area, and the third capacitor is formed by the bottom electrode and the sub-pixel electrode.

10. The display device as claimed in claim 9, wherein a voltage of the sub-area is less than a voltage of the main area.

11. The display device as claimed in claim 10, wherein a relationship between the voltage Vsub of the sub-area and the voltage Vmain of the main area is expressed as $Vsub=Vmain*Cx/(Clc\_sub+Cx)$, wherein Vsub is the voltage value of the sub-area, Vmain is the voltage value of the main area, Cx is the third capacitor, and Clc_sub is the second liquid crystal capacitor.

12. The display device as claimed in claim 9, wherein a gate insulating layer is disposed on a side of the bottom electrode that faces the sub-pixel electrode, and a protective layer is disposed between the gate insulating layer and the sub-pixel electrode.

13. The display device as claimed in claim 12, wherein a first metal layer is disposed on a side of the gate insulating layer that faces away from the bottom electrode, at least one through hole extending through the gate insulating layer is provided on a surface of the gate insulating layer, a side of the bottom electrode that faces the gate insulating layer is exposed from the through hole, and the first metal layer is deposited in the through hole and electrically connected to the bottom electrode.

14. The display device as claimed in claim 12, wherein the bottom electrodes are in a one-to-one correspondence with main pixel electrodes of the sub-pixels, and one bottom electrode corresponds to the main pixel electrode of one sub-pixel.

15. The display device as claimed in claim 12, wherein one bottom electrode corresponds to the main pixel electrodes of more than two sub-pixels.

16. The display device as claimed in claim 9, wherein a first storage electrode connected to the drain of the first TFT is disposed in the main area; the first storage capacitor is formed by the first storage electrode and the second common electrode; the first liquid crystal capacitor is formed by a main pixel electrode in the main area and the first common electrode; the first storage electrode is connected to the main pixel electrode through a via hole;
  a second storage electrode connected to the drain of the second TFT is disposed in the sub-area; the second storage capacitor is formed by the second storage electrode and the second common electrode; the second liquid crystal capacitor is formed by a sub-pixel electrode in the sub-area and the first common electrode; and the second storage electrode is connected to the sub-pixel electrode through the via hole.

* * * * *